United States Patent
Waltereze (10) Patent No.: US 10,296,537 B1
(45) Date of Patent: May 21, 2019

(54) SYSTEM AND METHOD FOR IDENTIFYING A LOCK ASSOCIATED WITH A GIVEN KEY

(71) Applicant: Walter C. Waltereze, Stevenson Ranch, CA (US)

(72) Inventor: Walter C. Waltereze, Stevenson Ranch, CA (US)

( * ) Notice: Subject to any disclaimer, the term of this patent is extended or adjusted under 35 U.S.C. 154(b) by 0 days.

(21) Appl. No.: 15/886,474

(22) Filed: Feb. 1, 2018

(51) Int. Cl.
*G06F 16/583* (2019.01)
*G06K 9/00* (2006.01)
*G06F 3/0482* (2013.01)
*G06T 7/10* (2017.01)
*E05B 19/24* (2006.01)

(52) U.S. Cl.
CPC .......... *G06F 16/5838* (2019.01); *E05B 19/24* (2013.01); *G06F 3/0482* (2013.01); *G06K 9/00201* (2013.01); *G06T 7/10* (2017.01)

(58) Field of Classification Search
CPC ............. G06F 17/30256; G06F 3/0482; G06F 17/3025; G06T 7/10; E05B 19/24; G06K 9/00201
See application file for complete search history.

(56) References Cited

U.S. PATENT DOCUMENTS 1,485,075 A * 2/1924 Gumaer .................. E05B 19/24
40/330
1,816,642 A * 7/1931 Fetter ...................... E05B 19/24
116/205
3,093,920 A * 6/1963 Epstein ................... E05B 19/04
40/330
3,225,478 A 12/1965 Rohmer
3,324,586 A * 6/1967 Mitchell ................. E05B 19/24
40/330
3,733,862 A * 5/1973 Killmeyer ............ E05B 49/006
250/215
4,180,284 A 12/1979 Ashley
4,188,741 A * 2/1980 Levy ....................... E05B 19/24
40/330
4,417,410 A * 11/1983 Freedom .................. G09F 3/04
40/330
4,783,655 A 11/1988 Cobb et al.
(Continued)

FOREIGN PATENT DOCUMENTS

DE     202013006216     10/2013
GB         2249773       5/1992
(Continued)

*Primary Examiner* — Nay Tun
(74) *Attorney, Agent, or Firm* — The Concept Law Group, P.A.; Scott M. Garrett; Scott D. Smiley (57) ABSTRACT

An apparatus and system facilitates the identification of a key and its corresponding lock by marking each key with a unique indicia element that has a unique set of indicia. The indicia is easily recognized by a computing device using an image recognition process, and can map the unique indicia into a corresponding unique identifier to create a record that correlates the key with a specific lock, indicating the lock's location and other information about the lock. A user, given a key with indicia element on it, can then determine the lock to which the key corresponds by the indicia being automatically recognized, and used to locate a record corresponding to the indicia, and presenting the information in the record to the user.

14 Claims, 7 Drawing Sheets

(56) References Cited

U.S. PATENT DOCUMENTS

| | | | |
|---|---|---|---|
| 4,899,391 A * | 2/1990 | Cimino | G06K 9/00 |
| | | | 340/680 |
| 4,924,078 A | 5/1990 | Sant' Anselmo et al. | |
| 5,083,662 A * | 1/1992 | Bishop | E05B 19/24 |
| | | | 206/37.1 |
| 5,132,661 A * | 7/1992 | Pinnow | E05B 49/006 |
| | | | 340/5.28 |
| 5,311,757 A * | 5/1994 | Spahn | E05B 19/00 |
| | | | 235/492 |
| 5,339,549 A | 8/1994 | David et al. | |
| 5,543,665 A * | 8/1996 | Demarco | B60R 25/04 |
| | | | 340/5.6 |
| 5,801,628 A | 9/1998 | Maloney | |
| 6,094,954 A * | 8/2000 | Carmen | E05B 19/24 |
| | | | 40/330 |
| 6,095,567 A | 8/2000 | Buell | A44B 15/005 |
| | | | 283/75 |
| 6,256,638 B1 | 7/2001 | Dougherty et al. | |
| 6,422,474 B1 | 7/2002 | Gossweiler, III et al. | |
| 6,604,308 B1 * | 8/2003 | Robles | E05B 19/04 |
| | | | 40/330 |
| 6,637,245 B1 * | 10/2003 | Bolton | E05B 19/04 |
| | | | 70/278.3 |
| 6,662,078 B1 | 12/2003 | Hardgrave et al. | |
| 6,707,381 B1 | 3/2004 | Maloney | |
| 6,839,451 B2 * | 1/2005 | Campbell | B23C 3/35 |
| | | | 382/100 |
| 6,895,100 B1 | 5/2005 | Pacenzia | B23C 3/35 |
| | | | 358/540 |
| 6,951,122 B1 * | 10/2005 | Jheng | E05B 19/04 |
| | | | 40/330 |
| 7,849,721 B2 * | 12/2010 | Bass | A45C 11/321 |
| | | | 307/10.3 |
| 8,106,774 B2 | 1/2012 | Hamilton et al. | |
| 9,562,998 B2 | 2/2017 | Edmonds et al. | |
| 9,582,595 B2 | 2/2017 | Trifa et al. | |
| 9,598,879 B2 * | 3/2017 | Denson | E05B 19/0017 |
| 9,938,750 B2 * | 4/2018 | Moore | E05B 19/24 |
| 2005/0072198 A1 * | 4/2005 | Casellini | E05B 19/24 |
| | | | 70/408 |
| 2005/0088282 A1 * | 4/2005 | Denson | G06K 9/00604 |
| | | | 340/5.73 |
| 2006/0026878 A1 * | 2/2006 | Slater | G09F 3/00 |
| | | | 40/634 |
| 2006/0027662 A1 | 2/2006 | Baradi | |
| 2006/0059964 A1 * | 3/2006 | Bass | A45C 11/321 |
| | | | 70/408 |
| 2006/0265917 A1 * | 11/2006 | Wilson | E05B 19/24 |
| | | | 40/330 |
| 2008/0149711 A1 * | 6/2008 | Griffits | E05B 17/103 |
| | | | 235/385 |
| 2010/0269382 A1 * | 10/2010 | Moore | E05B 19/24 |
| | | | 40/330 |
| 2011/0163529 A1 | 7/2011 | Rossing | |
| 2013/0179276 A1 | 7/2013 | Wheelon et al. | |
| 2013/0223675 A1 * | 8/2013 | Belrose | G06F 17/30244 |
| | | | 382/100 |
| 2014/0116101 A1 * | 5/2014 | Moore | E05B 19/24 |
| | | | 70/336 |
| 2015/0191342 A1 | 7/2015 | Wegelin et al. | |
| 2015/0371470 A1 * | 12/2015 | Brown | G07C 9/00896 |
| | | | 340/5.61 |
| 2016/0326772 A1 * | 11/2016 | Denson | E05B 19/0017 |

FOREIGN PATENT DOCUMENTS

| | | |
|---|---|---|
| WO | 2016176223 | 11/2016 |
| WO | 2016177943 | 11/2016 |

* cited by examiner

SYSTEM AND METHOD FOR IDENTIFYING A LOCK ASSOCIATED WITH A GIVEN KEY

FIELD OF THE INVENTION

The present invention relates generally to locks that use keys to lock and unlock the lock, and, more particularly, relates to a system and method that allows a user to present a key to a computing device that recognizes a distinct visual characteristic of a indicia element affixed to the key, and present information indicating the lock to which the key corresponds.

BACKGROUND OF THE INVENTION

The most common way to physically exclude people from an enclosed area or space is by use of a lock. A lock can be incorporated into a door or other structure, or it can be a separate device (e.g. a padlock) that secures a door or structure to an adjoining wall or structure. It is common for a given person or organization to have a number of locks and associated keys. It is also common for a person to forget which key corresponds to which lock, as well as to forget what a given key is for. For example, a person can have a key ring or key chain with several keys on it. Several of the keys can have a similar configuration. If the keys are not marked then the user may not be able to distinguish them. This problem can be greatly compounded when a person who routinely uses the keys is unavailable, and a person unfamiliar with the keys must find one or more keys to unlock or lock a given lock or locks. In another example, it is not uncommon for a person who has a key ring to, over time, collect keys to various lock, and through a lack of use, forget which lock one or more of the keys is for.

This problem has been addressed by using identifiers on one or more keys. For example, a commonly available product is a key identifier that is a part that goes over the handle of a key. Typically these are sold in packages with several key identifiers that are all different colors. Each color can be used to identify a different lock/door to which the particular key on which the key identifier is placed corresponds. However this system relies on the person's memory, and a different person may not know the color scheme, or the person may forget which color corresponds to which door/lock. In addition, if there are a large number of keys, a color scheme of several color may not be enough, and if other visual characteristics are used, it can be impractical for a person to memorize all of the key identifiers. In the case of a large number of keys, it is also common to simply include indicia on each key, such as, for example, a room number, to identify the lock to which the key corresponds. However that may be undesirable in some circumstances where it may be desirable to keep the identification of a lock/key pair such that unauthorized parties cannot identify the lock given the key.

Therefore, a need exists to overcome the problems with the prior art as discussed above.

SUMMARY OF THE INVENTION

The invention provides a system and method for identifying a lock associated with a given key that overcomes the hereinafore-mentioned disadvantages of the heretofore-known devices and methods of this general type and that further allows the technology to be adapted to other applications.

With the foregoing and other objects in view, there is provided, in accordance with some embodiments of the invention, a system for memorializing a lock and a key to identify the lock based on the key. The system can include a plurality of unique indicia elements that are each sized to fit on a key handle, and which are provided together on a sheet and organized by one or more distinct visual characteristics of a unique indicia set at a front side of each unique indicia element. Each unique indicia element can have a back side on which an adhesive cement is disposed. The system can further include a tool having an elongated body that has an active suction cup at one end of the elongated body which can be sized to fit over less than an entirety of each of the plurality of unique indicia elements. The tool can further include a pump activator that is connected to an opening on a surface of the suction cup via a passage through the elongated body in order to create a suction between the surface of the suction cup and the front side of a selected one of the plurality of unique indicia elements in order to facilitate removal from the sheet, and then placement of the selected unique indicia element on the handle of the key.

In accordance with another feature, an embodiment of the system provides that the front surface of each of the plurality of the unique indicia elements can be a transparent dome through which the one or more distinct visual characteristics of a unique indicia can be seen.

In accordance with a further feature of the system, each of the plurality of unique indicia elements can have a circular plan profile.

In accordance with a further feature of the system, the circular plan profile for each of the plurality of unique indicia elements can be less than six millimeters in diameter, and the suction cup of the tool can have a diameter that is smaller than that of the plan profile of the plurality of unique indicia elements.

In accordance with a further feature of the system, the one or more distinct visual characteristics of the unique indicia at the front side of each unique indicia element can include a color, a geometric shape, and an alphanumeric character.

In accordance with a further feature of the system, the plurality of unique indicia elements can be organized by being grouped first according to color, then according to geometric shape, and then according to alphanumeric character.

There is further provided, in accordance with some embodiments of the invention, a method for facilitating identifying a lock corresponding to a key. The method can include presenting, in a field of view of a camera coupled to a computing device, a key including a unique indicia element such that the unique indicia element is in view of the camera. The method can further include capturing an image through the camera, including the unique indicia element. The method can further include processing the image to recognize at least one distinct visual characteristic of the unique indicia element, and cross referencing the identified at least one distinct visual characteristic with a database to find a record corresponding to the key, the record containing information about the lock corresponding to the key. The method can further include presenting, on a graphical user interface of the computing device, the information about the lock.

In accordance with a further feature of the method, the unique indicia element can have a circular plan profile that has a diameter of less than six millimeters.

In accordance with a further feature of the method, the method can further include processing the image to recognize a color, a geometric shape, and an alphanumeric character of the unique indicia element, and cross referencing the identified at least one distinct visual characteristic with the database comprises cross referencing the color, geometric shape, and alphanumeric character with the database.

In accordance with a further feature of the method, presenting the information about the lock includes presenting a map indicating a geographic location of the lock.

In accordance with a further feature of the method, the method can further include placing the unique indicia element on the key, photographing the key with the unique indicia element to produce an initial image of the key, recognizing, by a computing device, the at least one distinct visual characteristic of the unique indicia element in the initial image, presenting on a graphical user interface a form for receiving input from a user and the an indication of the at least one distinct visual characteristic, receiving, from a user, the information about the lock corresponding to the key, and creating the record wherein the at least one distinct visual characteristic is associated with the lock, and, including in the information, a location of the lock.

In accordance with a further feature of the method, placing the unique indicia element on the key can include selecting the unique indicia element from a plurality of unique indicia elements, each having at least one distinct visual characteristic. The plurality of unique indicia elements can be organized on a sheet according to the at least one distinct visual characteristic of each of unique indicia element. The method can further include removing the unique indicia element from the sheet using a suction tool and then performing the step of placing the unique indicia element on the key.

In accordance with some further embodiments of the invention, there is a system for recording information about a lock and associating a key with the lock. The system can include a plurality of unique indicia elements, each having indicia including at least one unique visual characteristic. Each of the plurality of unique indicia elements can be configured to fit on, and be adhered to, a handle of a key. The system can further include a computing device having a camera and a processor. The computing device can be operably coupled to a data store. The processor can be configured, by execution of instruction code, to operate in an input mode and a query mode. In the input mode the processor can be configured to process an initial image taken by the camera of a key having a selected indicia element affixed thereto, recognize, in the initial image, the at least one distinct visual characteristic of the selected indicia element and map the at least one distinct visual characteristic to a unique digital identifier, receive input from a user including information that identifies a lock to which the key corresponds, and create a record in the data store including the digital identifier and the information. In the query mode the processor can be configured to process a query image taken by the camera of a subject key having a subject indicia element. In the input mode the processor can further recognize, in the query image, the at least one distinct visual characteristic of the subject indicia element and map the at least one distinct visual characteristic of the subject indicia element to a unique subject digital identifier, and search the data store for a subject record including a digital identifier that matches the subject digital identifier. The record can include information indicating a lock that corresponds to the subject key. Further, the processor can present the information of the subject record on a graphical user interface of the computing device that indicates the lock corresponding to the subject key.

In accordance with a further feature of the system, the at least one distinct visual characteristic for each of the plurality of unique indicia elements includes a unique combination of a color, a geometric shape, and an alphanumeric character.

In accordance with a further feature of the system, the system can further include a tool having an elongated body having a suction cup at one end of the elongated body that is sized to fit over less than an entirety of each of the plurality of unique indicia elements. The tool can have a pump activator that is connected to an opening on a surface of the suction cup via a passage through the elongated body that creates a suction between the surface of the suction cup and the front side of a selected one of the plurality of unique indicia elements to facilitate placement of the selected one of the plurality of unique indicia elements on the handle of the key.

In accordance with a further feature of the system, the data store can be located inside the computing device.

In accordance with a further feature of the system, the computing device can include a network interface and is operably coupled to the data store through a data network via the network interface.

In accordance with a further feature of the system, a front surface of each of the plurality of the unique indicia elements can be a transparent dome through which the at least one distinct visual characteristic can be seen.

In accordance with a further feature of the system, each of the plurality of unique indicia elements can have a circular plan profile.

In accordance with a further feature of the system, the circular plan profile for each of the plurality of unique indicia elements can be less than six millimeters in diameter.

Although the invention is illustrated and described herein as embodied in a system and method for identifying a lock associated with a given key, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system for matching a record with a physical object. In particular, the system is useful to indicate a lock that corresponds with a given key by automatically recognizing the unique indicia on an indicia element that is affixed to a key.

Figure 1:
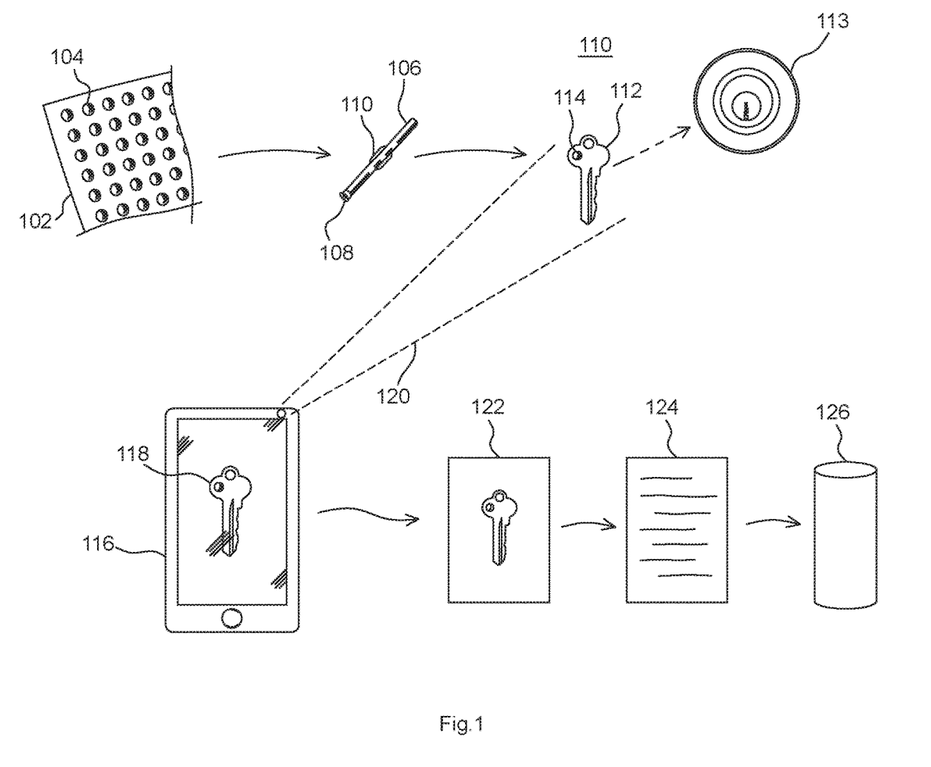
FIG. 1 shows a system for marking a key with unique indicia, and creating a digital record that associates the indicia with the key, and the key with a corresponding lock, in accordance with some embodiments.

Referring now to FIG. 1, there is shown therein a system 100 for marking a key 112 with a unique indicia element 114, and creating a digital record 124 that associates the indicia set of the unique indicia element 114 with the key 112, and the key 112 with a corresponding lock 113, in accordance with some embodiments. In general, a plurality of unique indicial elements 104 can be provided on a sheet 102. Each of the unique indicia elements can be the same size and shape, and each is created with one or more distinct visual characteristics as an indicia set such that no two indicia elements have the same indicia set, at least among the indicia elements on the sheet 102. In some embodiments the indicia set can include a color, a geometric shape, and a digit or alphanumeric character. Each unique indicia element can be adhered to the sheet on a release layer with an uncured cement. When a given indicia element is removed, the cement may begin curing to affix the indicia element to a key.

A selected indicia element (e.g. 104) can be removed from the sheet 102 using a tool 106. The tool 106 is generally elongated, and can be in a form factor approximately the size of an ordinary writing pen or pencil. At one end of the tool 106 is a suction cup 108 that has a channel or passage to a suction control element 110 that can be manipulated by a user to create a vacuum to aid in creating suction in the suction cup 108. The suction cup 108 is sized to cover a majority, but less than the entirety of each of the indicia elements 104, individually. The tool 106 allows a user to easily remove a selected indicia element from the sheet 102 without having to touch or contact the adhesive cement on the backside of the indicia element, and it allows easier control for movement of the indicia element compared to trying to hold it between a user's fingertips, for example. Using the tool 106, a selected indicia element can be removed from the sheet 102, and placed onto the handle of a key 112, by pressing the backside of the indicia element against the handle of the key 112 to place the adhesive cement between the backside of the indicia element 114 and the surface of the handle of the key 112. The indicia element 114 will then be affixed to the key 112 when the adhesive cement cures.

Those skilled in the art will recognize that there are a great variety of sizes and shapes of keys. In general a key has a blade section and a handle or bow sections. The blade section includes cuts on one or both sides of the blade that adjust the position of pins inside a lock tumbler to allow the tumbler to turn, and thereby lock or unlock. Generally the blade section is made of metal to resist wear, although other materials are sometimes used. The handle or bow typically include an extension of the material used to form the blade, and is wide that the blade to provide leverage to a user in turning the key in the lock. The handle can be bare, or it may have a cover such as a polymeric material. In some cases the handle of the key can include electronics in a key fob that acts as a handle, as is common, for example, with automobile keys. Accordingly, the indicia elements must be sized to fit on a variety of key handles, and shaped to resist being accidently dislodged from the key or create an uncomfortable surface for a user in using the key.

Once the indicia element 114 with its unique indicia set is placed on a key 112, the indicia set of the indicia element 114 can be recognized by a computing device 116. The computing device 116 can be, for example, a smartphone device that includes a camera having a field of view 120, and has an application program installed that can be executed to perform the functions described herein. After initializing the program application, the key 112 can be placed in the field of view 120 of the camera and an image including an image 118 of the key can appear on a graphical display of the device 116. Portions of the key 112 may be obscured, such as if the user is holding the key by the blade portion, but the indicia element 114 must be in view. The application program performs an image recognition process in an attempt to identify an indicia set in the image. The image recognition process can be performed in one of several ways. In general, the image recognition function performs a pattern matching process to match patterns in the image with the known pattern that results from the indicia element being in view. The image recognition process can be an on-going process, where the program processes successive images autonomously captured by the camera until a match is found, or a user can cause a single image to be captured which is then processed by the program.

In an image 122 the indicia element is recognized based on the distinct visual characteristics (e.g. color, shape, character). The distinct visual characteristics that make up the indicia set of the of the indicia element 114 can be used to generate a unique digital identifier that can be used to identify a digital record 124. The record 124 includes information input by a user to identify the lock 113 to which the key 112 corresponds. The information can include, for example, a name of the lock and a location of the lock. The digital identifier generated from the indicia set can be used to index the record 124 in a database or data store 126 in metadata associated with the record 124. The record 124 can include the image 122 to later allow a user to visually verify that the key being queried matches the key 112 in the record 124. Once the record 124 is formed, it can then be stored in the data store 126. The data store 126 can be located inside the device 116, or it can be located remotely from the device 116 and accessed over a network.

Once a set of records have been created, they persist in the data store 126 to allow a user to later query the data store to determine which lock a given key corresponds. The key that is the subject of the query (the "query key") must have an indicia element associated with it. The query key can be presented in the field of view of the camera of the computing device, and the indicia element recognized. The recognized indicia element's indicia set is then used to generate a digital identifier, which is used to find a matching record in the data store 126. Once the matching record is found, the information in the matching record can be displayed to the user so that the user can learn which lock the query key is used with.

Figure 2:
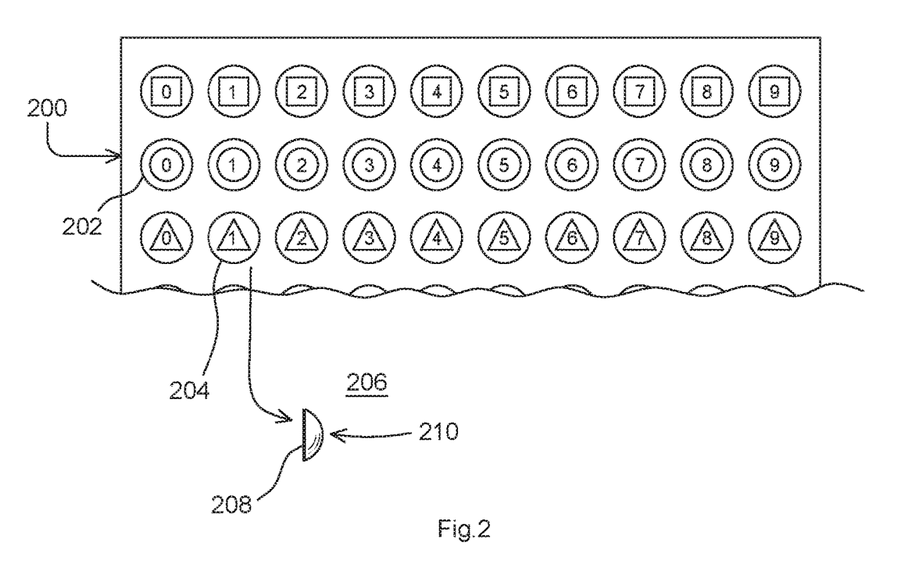
FIG. 2 shows a detail plan view of a sheet that carries a plurality of unique indicia elements that are to be affixed to a key in order to uniquely identify that key in the system, in accordance with come embodiments.

FIG. 2 shows a detail plan view of a sheet 200 that carries a plurality of unique indicia elements (e.g. 202, 204) that are to be affixed to a key in order to uniquely identify that key in the system, in accordance with come embodiments. The sheet 200 includes a release layer backing on which the indicia elements are adhered by a layer of uncured adhesive cement. Removal from the release layer start the curing process. In some embodiments, it is contemplated that the indicia elements have a circular plan profile, meaning when looking at them from the top (e.g. a plan view), as shown here in FIG. 2, they appear circular. However, they do not necessary have to be flat. In outset view 206 a side view of an indicia element 204 is shown. This is the view looking along the plane of the sheet 200. The back side 208 has a layer of adhesive cement to affix the indicia element 204 to a key handle. From the indicia element 204 has a domed side profile produced by a transparent material that allows the indicia set to be seen, while protecting the indicia set from wear. Furthermore, the domed profile presents no sharp corners or edges, which could snag on other keys or object and tend to dislodge the indicia element from a key. The domed shape also presents a relatively comfortable surface that a user of a key can bear against while operating the key without any discomfort due to corners or edges. In some embodiments the indicia elements can be formed as durable urethane "bubbles" that are domed, with a flat back surface on which a curable adhesive can be disposed, and with unique indicia on its domed front surface.

What is shown in FIG. 2 is one set, or part of one set of indicia elements. A set, as used here, is defined by a common visual characteristic. For example, each indicia element can have a color, a geometric shape, and a digit or alphanumeric character. As such, all of the indicia elements in FIG. 2 can have the same color. The color refers to a background color on which the geometric shape and digit are shown. As shown in FIG. 2, there are three rows of indicia elements. All of the rows shown can have the same background color (e.g. blue, red, yellow, green, orange, or violet). Each indicia element in a given row has the same geometric shape (e.g. circle, square, triangle, star, pentagon, hexagon, etc.). Each indicia element in each row therefore has a common background color and geometric shape, but each has a different digit. Therefore, there is a hierarchy of visual characteristics with color being the broadest, then geometric shape, then digit. Therefore, to refer to any particular indicia element one can use the format "[color; shape; digit]." So, for example, one indicia element can be identified uniquely as "[red; triangle; 5]," while another can be identified as "[green; square; 0]."

As such, indicia elements can be organized on the sheet 200 in sections according to color, then in each color section in rows according to geometric shape, and then each indicia element in a row can have a unique character or digit (e.g. in columns that traverse the rows). Using a combination of six color, six shapes, and ten digits (0-9), for example, a total of 360 unique indicia elements can be provided on a given sheet. It is contemplated that other forms of indicia can be used, such as barcodes, however, while barcodes can be readily recognized and decoded by a machine, they are not so easily read by humans. A formula like color/shape/digit is much easier for a human to remember, and thus the indicia elements can also serve to remind a person as to which lock a given key corresponds, which can obviate the need for a query.

Figure 3:
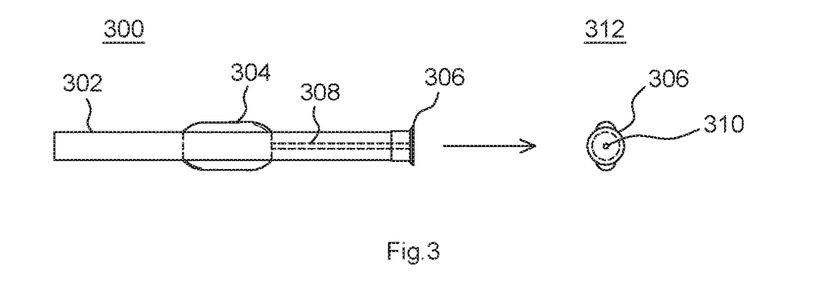
FIG. 3 shows a side view of a tool used to remove a selected indicia element from the sheet and affix it to a key, in accordance with some embodiments.

FIG. 3 shows a side view of a tool 300 used to remove a selected indicia elements from the sheet (e.g. sheet 200) and affix it to a key, in accordance with some embodiments. The tool 300 of the present exemplary embodiments has an elongated body 302 that can be approximately the size of a conventional writing instrument (e.g. ink pen or pencil). At one end of the body 302 there can be disposed a suction cup 306. The suction cup 306 is made of a generally compliant, impermeable material, like rubber, and comprises a skirt that extends away and outward, forming a cup or bowl shape. A front view 312 is shown as an inset, which shows the suction cup 306 looking along the axis of the elongated body 302. A suction bulb 304 or equivalent apparatus is provided on the elongated body 302, and is operably coupled through a passageway 308 to an opening 310 in the suction cup 306. Thus, when suction bulb 304 is compressed, air is expelled out through opening 310. The suction cup 306 can then be placed over a selected one of the indicia elements, and the suction bulb released. The suction bulb can be designed such that the walls of the suction bulb 304 are naturally urged outward, or a spring can be used to more forcefully urge the sides of the compression bulb 304 outward, thereby creating a suction at the opening 310 when the compressed suction bulb 304 is released. Likewise, once the selected indicia element is placed on the key, the suction bulb 304 can again be compressed to release the suction cup 306 from the indicia element.

As mentioned earlier, the indicia elements are sized to fit onto most keys, assuming a range of sizes. In some embodiments, the indicia elements can have a diameter of six millimeters or less. In some embodiments they can have a diameter of five millimeters. To ensure that the suction cup is able to retain an indicia element, while avoiding contact with the adhesive cement, and allowing for clearance when placing an indicia element on a key, the suction cup can have a diameter that is less than that of the indicia elements. To be effective, however, while the suction cup can cover less than the entirely of the indicia element (e.g. its upper surface), it must still over most of the indicia element to have a proper suction that allows the indicia element to be removed from the sheet, which requires more force than simply retaining the indicia element in the suction cup 306. Accordingly, when, for example, the indicia elements are five millimeters in diameter, the suction cup 306 can have a diameter of four millimeters.

Figure 4:
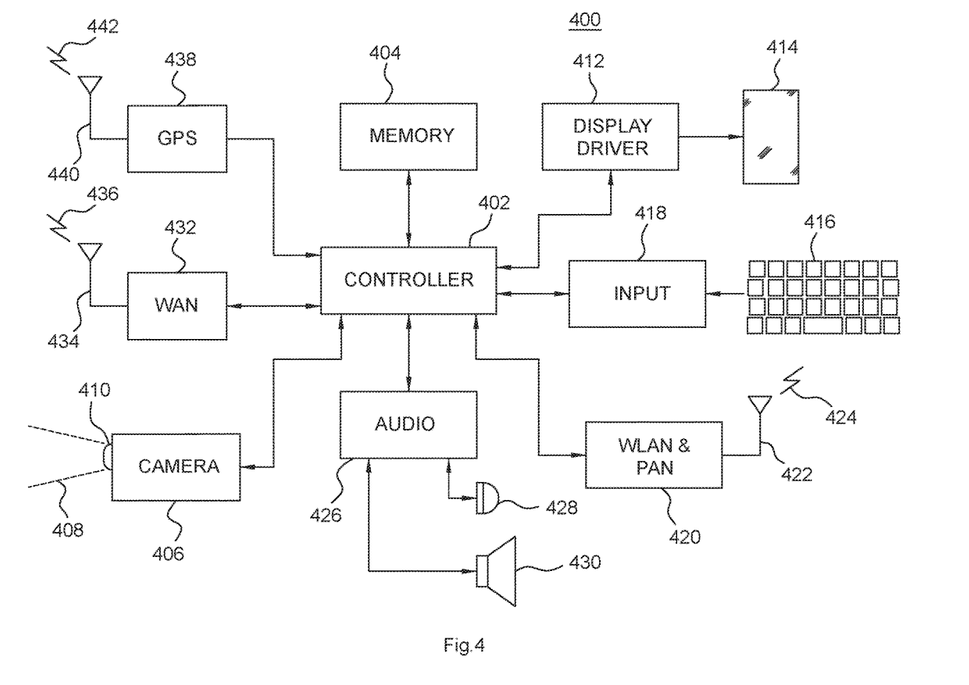
FIG. 4 shows a block schematic diagram of a computing device embodied as a smartphone for use in the system, in accordance with some embodiments.

FIG. 4 shows a block schematic diagram of a computing device 400 embodied as a smartphone for use in the system, in accordance with some embodiments. The computing device 400 can store records of keys, as well as run the application program necessary to create records and perform queries against the records. A controller 402 generally operates by performing machine readable instruction code that can be produced by compiling code created in a programming language such as C++, Java, Ruby, or any other suitable programming language. The controller 02 is coupled to a memory 404, which, as shown here, can represent several different types of memory, including read only memory (ROM), random access memory (RAM), flash memory, and so on. Application code and operating system code can be stored in a flash memory that is part of aggregate memory 404, and instantiated in RAM for execution by the controller 402.

The controller is operably coupled to a camera circuit module 406 that includes an image sensor that produces digital information from light incident on the image sensor. A lens 410 is used to collect light from a field of view 408 and focus it on the image sensor. Image data can be processed at the camera module into a standardized format, and then provided to the controller 402 for further operation such as a recognition process that attempts to locate the likeness of an indicia element and its unique indicia set. The image information, as well as other information, can be displayed on a graphical display 414 that is operated by a display driver circuit module 412. Input can be received via an input device 416, which can be a physical keyboard, pointing device, virtual keyboard, touch input, and so on. The various input is processed by an input circuit module 418 to convert input signals produced by the input devices 416 into data that can be used by the controller 402. Thus, a user can select object displayed on the graphical display 414, enter text and other information, manipulate menus, and so on.

A wireless local or personal area network (WLAN/PAN) transceiver 420 allows the device 400 to communicate with local network devices such as, for example, WiFi access points. The WLAN/Pan transceiver 420 is a radio circuit module that modules signals for transmission and demodulates received signals to extract data being received. Thus, and antenna 422 is used to transmit and receive signals over a wireless link 424. An audio circuit module 426 processes audio signals. For example, a microphone 428 is used to convert acoustic signals to electrical signals in analog form. The audio circuit module can convert the analog audio signals into digital audio signals. Likewise, the audio circuit module 426 can receive digital audio signals to be played over a speaker 430, and convert those digital audio signals to analog electrical signals that are provided to, and used to drive, the speaker 430. The computing device 400 can further include a wide area network (WAN) transceiver 432, such as a cellular radio telephony transceiver. An antenna 434 can be used to establish a radio link 436 with a cellular communication base station according to an established air interface. The WAN transceiver 432 can be capable of supporting both voice (e.g. telephony) communication and data communication with a data network, including the Internet, through a cellular infrastructure. The computing device 400 can further include a location determination circuit module, such as a global positioning satellite receiver 438, which received positioning signals 442 from low orbit positioning satellites via an antenna 440. By receiving the signals of several such satellites, the location of the computing device on the face of the Earth can be determined. Location information can be recorded for a lock, indicating its location in a record created for a key. Accordingly, the computing device 400 can execute application program code to perform image processing and recognition, as well as file and record storage and retrieval. Records can be stored locally in memory 404, or remotely, where they can be accessed by either of the wireless networking transceiver (e.g. 420, 432).

Figure 5:
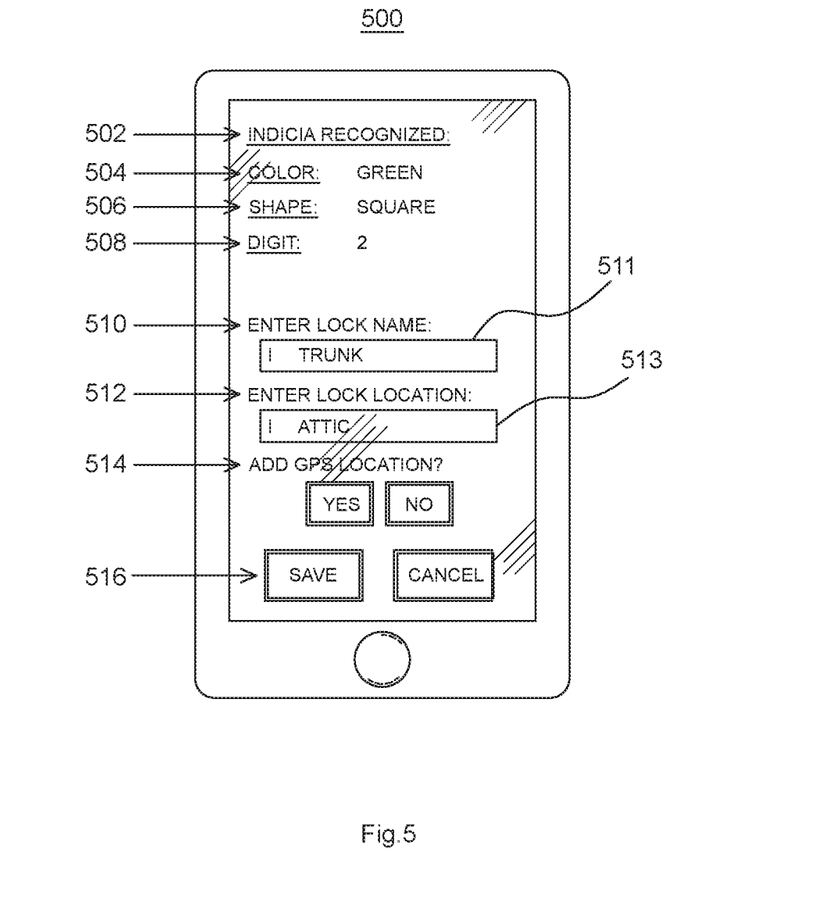
FIG. 5 shows a user interface screen of an application program being run on a computing device for creating or retrieving a record that associates unique indicia with a key, and the key with a corresponding lock, in accordance with some embodiments.

FIG. 5 shows a user interface screen 500 of an application program being run on a computing device for creating or retrieving a record that associates unique indicia with a key, and the key with a corresponding lock, in accordance with some embodiments. The exemplary screen 500 can represent a screen or form presented to a user upon the computing device recognizing the indicia set of an indicia element on a key presented in a field of view of a camera associated with or coupled to the computing device. A first section 502 indicates what indicia of the indicia set was recognized. For example, in a color section 504, it indicates green was recognized; for a shape section 506 it indicates a square was recognized; and for a digit section 508 it indicates that a "2" was recognized. A lock name section 510 either allows a user to input a lock name in a field 511, or a description of a lock or other information (e.g. a lock serial number) in a record creation mode. In a query mode this lock name section 510 can display the recorded lock name in the lock name field 511 as indicated in the retrieved record. In a lock location section 512 a lock location field 513 can be used to input the location of the lock associated with the key having the indicia element showing the recognized indicia in sections 504, 506, 508. In a query mode the lock location field 513 can display the recorded lock location information. In an input mode, the screen 500 can provide an optional GPS section 514 to allow the computing device to record it present location coordinates and add them to the record being created. This would be used when the user is operating the computing device at the lock's location. IN a query mode, the GPS section 514 can display the location coordinates, and provide a link to a mapping function showing the location on the map. In a completion section 516 the user can, in an input mode, save the information that has been entered, whereupon the computing device will then create and store the record.

In creating the record, the indicia of, for example, sections 504, 506, 508 are used to create a digital identifier. For example, each different color and each different shape can be assigned a different value. Thus, blue, green yellow, orange, red, and violet can be assigned values 0, 1, 2, 3, 4, and 5, respectively. Shapes can be likewise assigned values, and the digits are already values. A digital identifier can then be a digital value formed in twelve bits, containing three 4 bit-wide sections, one for color, one for shape, and one for digit, with each four bit section containing the digital value corresponding to the assigned value of the recognized indicia. Thus, for example, and indicia set for [yellow, triangle, 5] can be represented by a value "235" in bits (0010-0011-0101). This digital identifier is used to identify the record, and can even be used to organize the records sequentially.

Figure 6:
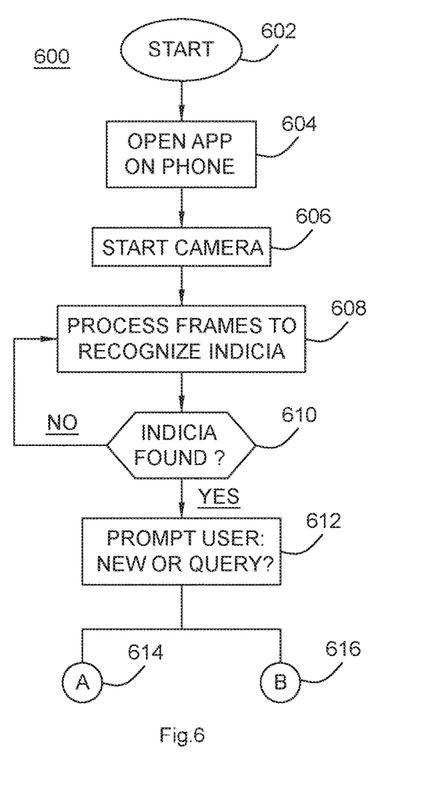
FIG. 6 is a flow chart diagram of a process for presenting a key having an affixed unique indicia element which is recognized by a computing device to commence either creation of a new record or commence a query based on the recognized indicia, in accordance with some embodiments.

FIG. 6 is a flow chart diagram of a process 600 for presenting a key having an affixed unique indicia element which is recognized by a computing device to commence either creation of a new record or commence a query based on the recognized indicia, in accordance with some embodiments. At the start 602 a computing device having an associated camera includes an instantiation of an application program to either create new records for keys/locks, or to perform a query on existing records to allow a user to determine the lock to which a key corresponds. Furthermore, at the start, a user has a key having a unique indicia element affixed on the key. The user may either intend to create a new record for the key to identify the lock to which the key corresponds, or may not know to which lock the key corresponds and seeks to query the records to determine the corresponding lock. In step 604, the application program can be opened (i.e. "run") in the computing device, which can be, for example, a smartphone device. In step 606 the application program causes the controller or processor of the computing device to activate the associated camera and commence processing image data produced by the camera in step 608. The image data is processed by parsing the image data into defined shapes, such as by using edge detection and other image processing techniques. Objects that are defined can be compared to a hierarchy of known patterns that indicate the presence of an indicia element in the image. For example, if it is known that the indicia elements are circular, then only detected circular image objects are further processed to identify matching colors, shapes, or other visually distinct characteristic known to be on indicia elements. Step 610 correspond to the process of searching for a matching pattern in the image data that corresponds to an indicia element, and whether one is detected by the recognition process. When an indicia element is found, the method 600 proceeds to step 612 where the computing device, in accordance with the software of the application program, can prompt the user to indicate whether the user is seeking to create a new record or perform a query of existing records using the recognized indicia set of the indicia element. Branch 614 is for creating a new record, while branch 616 is for performing a query. User input in response to the prompt in step 612 determines which branch 614, 616 will be followed.

Figure 7:
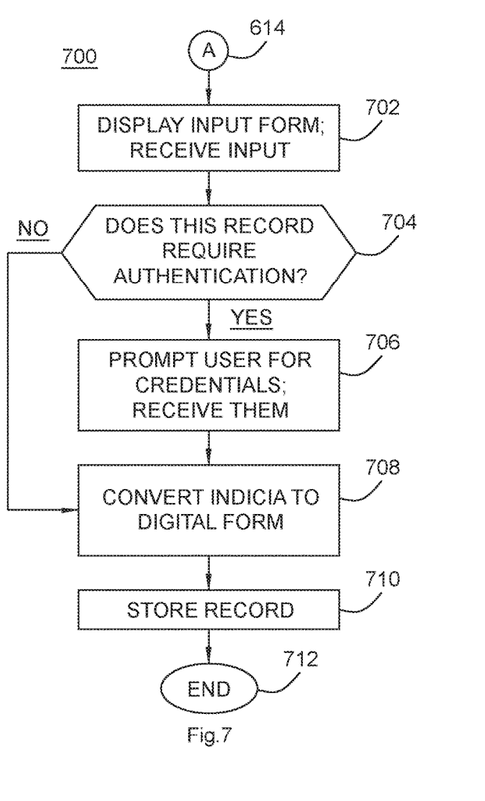
FIG. 7 is a flow chart diagram of a process for creating a record that associates a unique indicia set with a key, and the key with a corresponding lock, in accordance with some embodiments.

FIG. 7 is a flow chart diagram of a process 700 for creating a record that associates a unique indicia set with a key, and the key with a corresponding lock, in accordance with some embodiments. Thus, process 700 occurs when following branch 614 of FIG. 6. In step 702 the computing device can present in input form to the user to receive input from the user. The input information can include a lock name and a lock location, as well as other pertinent information the user may wish to include in the record. The user can also be prompted to indicate whether the record is the be secured, requiring authorization to access. Thus, in step 704 the process 700 determines whether the user has indicated whether the record is to be secured. If the user does intend for the record to be secured, then in step 706 the computing device can prompt the user to input authorization credentials (e.g. a password) that are used to secure the record from being accessed by unauthorized persons. Once the authorization credential is received the process proceeds to step 708 where a digital identifier is generated based on the unique indicia set of the recognized indicia element. In step 710 the computing device then stores the information as a record that can be identified by the digital identifier in a data store or database, and the record is secured if it was indicated that the user wanted the record to be secured in step 704. Subsequently the record can be found in a query by the digital identifier since a future query will use the same algorithm or process to create a digital identifier for the search query from recognized indicia of an indicia element. The process 700 can then end in step 712, or the process can repeat, returning to step 608 of method 600, for example, if another key/lock record is to be created.

Figure 8:
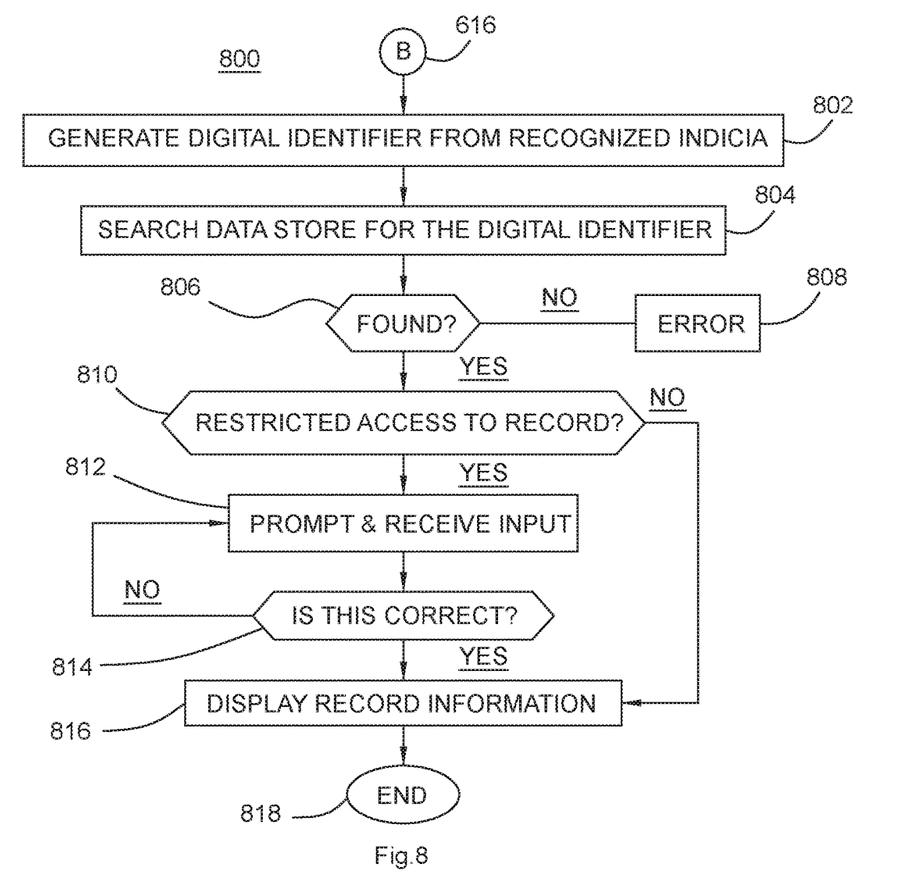
FIG. 8 is a flow chart diagram of a process for querying a database to determine the lock corresponding to the key having a recognized indicia set, in accordance with some embodiments.

FIG. 8 is a flow chart diagram of a process 800 for querying a database to determine the lock corresponding to the key having a recognized indicia set, in accordance with some embodiments. Process 800 results from following branch 616 of FIG. 6. Thus, at step 616, the computing device has recognized an indicia element in the field of view of the associated camera, and has determined the specific, unique indicia visible on the indicia element. The unique indicia can include patterns, colors, shapes, characters, etc. The indicia can therefore be processed in step 802 by a known algorithm to create a digital identifier or descriptor that will be unique to the unique indicia. The algorithm used will be the same as that used in step 708 of FIG. 7. In step 804 the computing device can search the data store to find a record having a matching digital identifier. Step 806 reflects the search process. If a record is not found, then an error message can be presented to the user in step 808, along with suitable contingency options. When a matching record is found, the process 800 proceeds to step 810 where the computing device (or remote server, if the records are remotely located) can determine whether the record being sought is subject to authorization or whether access is otherwise restricted. If the record does require authorization, then in step 812 the user can be prompted for the security credential (e.g. password). If the user's response is correct, as determined in step 814, then the process proceeds to step 816 where the information in the record is displayed to the user. The information can include a lock name, a lock location, an option to display a map showing the lock location on the map, a picture of the key for visual confirmation that the key is in fact the key that corresponds to the lock. The process 800 then ends in step 818, but the user can be given the option to return to the method of FIG. 6 to perform another operation.

In addition to matching a key to a lock, the embodiments of the disclosure can be used to facilitate other, similar applications. For example, in a storage system, an indicia element can be placed on the outside of a storage unit, and a record can be created that includes a listing of the contents of the storage unit. Upon loading a storage unit, a user can list contents in a file, or through an application on their phone, even including pictures of items being stored, and then associate an indicia element with the storage unit. Later, the same user, or another user, can use the mobile device and application to recognize the indicia element, and receive an indication of the contents of the storage unit. The information can be stored locally on the phone, in a cloud system, or both. The information can be presented in a graphic display, or read out loud using voice synthesis.

Figure 9:
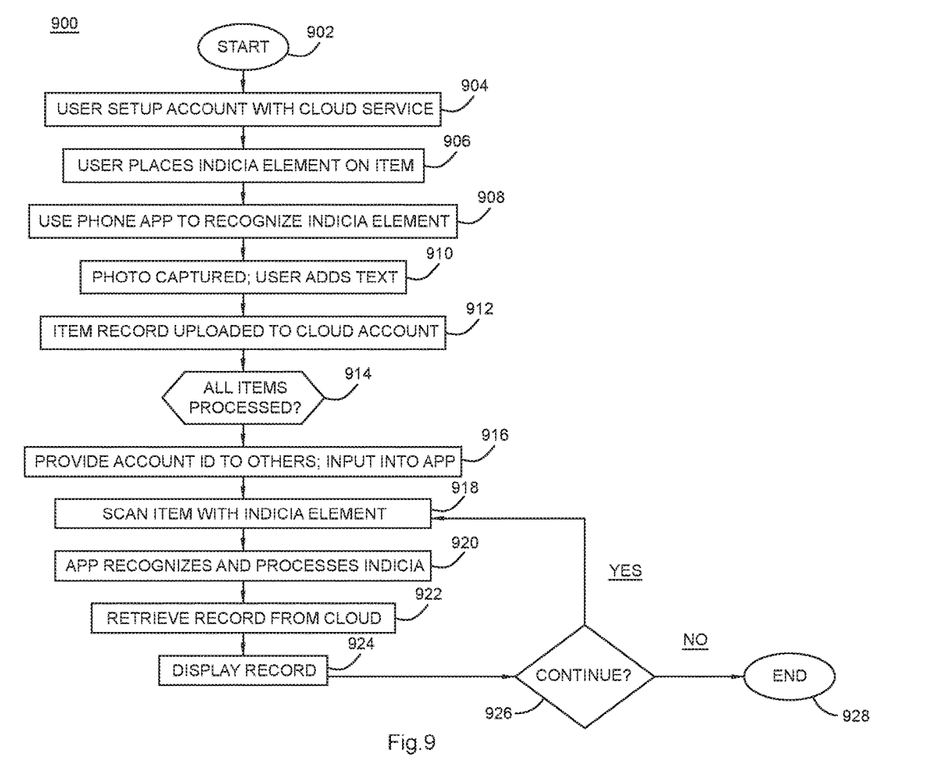
FIG. 9 is a flow chart diagram of a process for generally applying the indicia element technology to identify items.

FIG. 9 is a flow chart diagram of a process 900 for generally applying the indicia element technology to identify everyday items, general information management, data storage and community information funneling. The method illustrated here reflects the generic application of the system and method described in reference to identifying locks based on keys marked with an indicia element. At the start, a user can have a number of items for which the user wishes to create electronic, searchable records that can be accessed by others. Applications of the method 900 can include, for example, storage systems, garage/yard sales, small merchant storefronts, and so on. Thus, at the start 902, the user can have one or more items, boxes, storage spaces, or other things for which a record is to be created. In step 904 a user can create an account with a cloud service to allow mobile access to the record or records created by the system and method. The account can have an account identifier that uniquely identifies the account. The account can be created using an application program on a mobile phone device that has internet access. The cloud service can be run, for example, by the publisher of the application program. In step 906 the user places one of the indicia elements from the set of indicia elements on the item, and uses the mobile phone device running the application program, which can access the camera of the mobile phone device, to capture an image including the indicia element and the item to which is it affixed in step 908. The application program can parse the image to recognize the sub-image of the indicia element, process it to extract the indicia set of unique visual characteristic, and use that information to initiate the creation of a record locally, at the mobile phone device. The information to be included in the record can include the image, or a thumbnail version of the image, along with the coded indicia information. In step 910 the user can add information, such as text, to be stored in the record. The text can include, for example, a description of the item such as a history, contents (if a storage device), price, or any other information that may be of interest. The record also includes the account information for the account at the cloud service. In step 912 the record created at the mobile phone device can be transmitted to the account at the cloud service, which then saves it in association with the account, in a searchable manner that is based on the indicia. In step 914 the process of creating records can be stopped or continued, based on whether the user has more items.

In step 916 the user, or a different person, can, also using a mobile phone device and a version of the application program, input the account information (e.g. account identifier, username, etc.). The application program can then be used to capture an image of an item to which an indicia element is affixed in step 918. In step 920 the application program processes the captured image to recognize the indicia element in the image, and obtains the indicia information. In step 922 the mobile device, under control of the application program, can access the cloud service account by presenting the account information, and the recognized indicia information to retrieve the corresponding record. The cloud service uses the indicia information to cross reference and locate the record, and then transmit it to the mobile phone device. In step 924 the mobile phone device displays the record information, which can include the stored thumbnail image, for visual confirmation that it is the same item corresponding to the record. In step 926 the user can decide whether to repeat steps 918-924 for other items. If the user does not continue then the method ends 928.

Another application of the technology is for moving, such as moving from one house to another. As a user packages items into boxes, for example, the contents of each box can be recorded (text, image, or both) in a record, and then the record can be associated with the unique indicia of a given indicia element. After arriving at the new location, the contents of a box or package can be ascertained by using a mobile device with the application program to recognize a given record corresponding to recognized indicia of an indicia element on the outside of the box.

Yet another example of an alternate application is to use the indicia elements for marking items for sale. For example, at a yard sale, a user can mark items being sold with an indicia element. A record can be created for each indicia element, including a price, description, and other relevant information. The records for each of the items being offered for sale can be stored on a cloud server, and accessible with a code that can be provided to people perusing the items being offered for sale by the seller. The people shopping at the sale can use their mobile device, enter the code into an application, and access information for each item by using the mobile device to recognize the indicia element affixed to the item. The mobile device, upon executing the application program, and use the code to access the corresponding set of records for the particular sale. Thus, people at the sale can get information about each item being sold more easily.

A still further alternate application is to use the indicia elements to mark items in businesses, or boxes in which items are stored, to identify those items and store information about the items. In general it is useful for tracking items, allowing them to be tagged for discount, damage/repair information including diagnostic information storage, reserving equipment, and so on.

Accordingly, an apparatus, system, and method has been disclosed that allows a person to determine the lock to which a given key corresponds, which solves the problem of having a key or keys which the person does not remember or know to which locks they correspond. The apparatus, system, and method can be used in both large organizations with many lock and keys, as well as for personal applications where, over time, for example, a person can collect keys, and at some point not remember what lock a given key in their possession operates. Furthermore, the apparatus, system, and methods of the embodiments can be used equivalently for other applications to identify an object, and record information about the object, which can later be presented to a user upon automatically recognizing an indicia element affixed to the object, decoding the indicia on the indicial element, and retrieving and presenting information stored in an electronic record corresponding to the object.

What is claimed is:

1. A method for facilitating identifying a lock corresponding to a key, the method comprising:
   presenting, in a field of view of a camera coupled to a computing device, a key including a unique indicia element affixed to a handle of the key such that the unique indicia element is in view of the camera, the unique indicia element having at least three categories of distinct visual characteristics;
   displaying, on a graphical display of the computing device, the field of view of the camera including the key and unique indicia element;
   capturing an image of the field of view by the camera, including the unique indicia element;
   processing the image by the computing device using an image recognition process to recognize the distinct visual characteristics of the unique indicia element;
   cross referencing the identified distinct visual characteristics with a database to find a record corresponding to the key, the record containing information about the lock corresponding to the key; and
   presenting, on the graphical user interface of the computing device, the information about the lock;
   wherein the unique indicia element is unique among a defined plurality of indicia elements, each of the plurality of indicia elements having a unique set of the at least three categories visual characteristics.

2. The method of claim 1, wherein the unique indicia element has a circular plan profile having a diameter of less than six millimeters, and a domed surface.

3. The method of claim 1, wherein:
   processing the image to recognize the distinct visual characteristics of the unique indicia element comprises processing the image to recognize a color, a geometric shape, and an alphanumeric character of the unique indicia element, wherein the color is one of a plurality of colors selected for use with the defined plurality of indicia elements, the geometric shape is one of a plurality of geometric shapes selected for use with the defined plurality of indicia elements, and the alphanumeric character is one of a plurality of alphanumeric characters selected for use with the defined plurality of indicia elements; and
   cross referencing the identified distinct visual characteristics with the database comprises cross referencing the color, geometric shape, and alphanumeric character with the database.

4. The method of claim 1, wherein presenting the information about the lock includes presenting a map indicating a geographic location of the lock.

5. The method of claim 1, the method further comprising:
   placing the unique indicia element on the handle of the key;
   photographing the key with the unique indicia element to produce an initial image of the key;
   recognizing, by a computing device, the at least one distinct visual characteristic of the unique indicia element in the initial image;
   presenting on a graphical user interface a form for receiving input from a user and the an indication of the at least one distinct visual characteristic;
   receiving, from a user, the information about the lock corresponding to the key; and
   creating the record wherein the at least one distinct visual characteristic is associated with the lock, and including in the information a location of the lock.

6. The method of claim 5, wherein placing the unique indicia element on the key comprises:
   selecting the unique indicia element from a plurality of unique indicia elements each having at least one distinct visual characteristic, wherein the plurality of unique indicia elements are organized on a sheet according to the at least one distinct visual characteristic of each of unique indicia element; and
   removing the unique indicia element from the sheet using a suction tool and then performing the step of placing the unique indicia element on the key.

7. A system for recording information about a lock and associating a key with the lock, comprising:
   a plurality of unique indicia elements, each having indicia including a unique combination of at least three unique visual characteristics, each of the three unique visual characteristics being of a different type of visual characteristic that are each human readable, each of the plurality of unique indicia elements configured to fit on, and be adhered to, a handle of a key;
   a computing device having a camera, a graphical display, and a processor, the computing device being operably coupled to a data store, the processor is configured, by execution of instruction code to operate in an input mode and a query mode, wherein:
      in the input mode the processor is configured to:
         display an image of a field of view of the camera including the key on the graphical display;
         process an initial image taken by the camera of the image of the field of view including the key having a selected indicia element of the plurality of unique indicia elements affixed thereto;
         recognize, in the initial image, using an image recognition process, the at least three distinct visual characteristics of the selected indicia element and map the at least three distinct visual characteristics to a unique digital identifier;
         receive input from a user including information that identifies a lock to which the key corresponds; and
         create a record in the data store including the digital identifier and the information;

in the query mode the processor is configured to:
- display an image of a field of view of the camera on the graphical display, including a subject key having a subject indicia element that is one of the plurality of unique indicia elements affixed thereto;
- process a query image taken by the camera of the image of the field of view including the subject key;
- recognize, in the query image, the at least three distinct visual characteristics of the subject indicia element and map the at least three distinct visual characteristics of the subject indicia element to a unique subject digital identifier;
- search the data store for a subject record including a digital identifier that matches the subject digital identifier, the record including information indicating a lock that corresponds to the subject key; and
- present the information of the subject record on a graphical user interface displayed on the graphical display of the computing device that indicates the lock corresponding to the subject key.

8. The system of claim 7, wherein the at least three distinct visual characteristics for each of the plurality of unique indicia elements includes a unique combination of a color, a geometric shape, and an alphanumeric character, and wherein the color is one of a plurality of colors selected for use with the plurality of unique indicia elements, the geometric shape is one of a plurality of geometric shapes selected for use with the plurality of unique indicia elements, and the alphanumeric character is one of a plurality of alphanumeric characters selected for use with the plurality of unique indicia elements.

9. The system of claim 7, further comprising:
- a tool having an elongated body having a suction cup at one end of the elongated body that is sized to fit over less than an entirety of each of the plurality of unique indicia elements, a pump activator that is connected to an opening on a surface of the suction cup via a passage through the elongated body that creates a suction between the surface of the suction cup and the front side of a selected one of the plurality of unique indicia elements to facilitate placement of the selected one of the plurality of unique indicia elements on the handle of the key.

10. The system of claim 7, wherein the data store is located inside the computing device.

11. The system of claim 7, wherein the computing device includes a network interface and is operably coupled to the data store through a data network via the network interface.

12. The system of claim 7, wherein a front surface of each of the plurality of the unique indicia elements is a transparent dome through which the at least three distinct visual characteristics can be seen.

13. The system of claim 7, wherein each of the plurality of unique indicia elements have a circular plan profile.

14. The system of claim 13, wherein the circular plan profile for each of the plurality of unique indicia elements is less than six millimeters in diameter.

* * * * *